United States Patent [19]
Posti

[11] Patent Number: 6,002,919
[45] Date of Patent: Dec. 14, 1999

[54] RADIO SYSTEM FOR CORDLESS SUBSCRIBER LINE INTERFACE

[75] Inventor: Harri Posti, Oulu, Finland

[73] Assignee: Nokia Telecommunications OY, Espoo, Finland

[21] Appl. No.: 08/875,041

[22] PCT Filed: Jan. 3, 1996

[86] PCT No.: PCT/FI96/00007

§ 371 Date: Jul. 3, 1997

§ 102(e) Date: Jul. 3, 1997

[87] PCT Pub. No.: WO96/21998

PCT Pub. Date: Jul. 18, 1996

[30] Foreign Application Priority Data

Jan. 4, 1995 [FI] Finland ..................................... 950047

[51] Int. Cl.⁶ .................................................. H04B 17/00
[52] U.S. Cl. ........................ 455/67.1; 455/450; 455/517; 370/337; 370/442
[58] Field of Search .................................. 455/67.1, 422, 455/450, 455, 517, 504, 506, 509, 524, 522; 370/321, 337, 347, 442, 528

[56] References Cited

U.S. PATENT DOCUMENTS

| 5,283,806 | 2/1994 | Dartois et al. | 375/1 |
| 5,327,429 | 7/1994 | Dartois et al. | 370/82 |
| 5,572,510 | 11/1996 | Koivu | 455/67.1 |
| 5,778,075 | 7/1998 | Haartsen | 455/422 |
| 5,806,003 | 9/1998 | Jolma et al. | 455/522 |
| 5,839,071 | 11/1998 | Johnson | 455/440 |
| 5,870,673 | 2/1999 | Haartsen | 455/426 |

FOREIGN PATENT DOCUMENTS

| 2 236 454 | 4/1991 | United Kingdom | H04Q 7/00 |
| 95/09512 | 4/1995 | WIPO | H04Q 7/34 |

OTHER PUBLICATIONS

Mouly et al: "The GSM system for Mobile Communications", published by the Authors: 49, rue Louise Bruneau, F–91120 Plaiseau, France.

Goodman: "Second Generation Wireless Information Networks", IEEE Transactions On Vehicular Technology, vol. 40, No. 2, May 1991, p. 368–p. 369; p. 371–p. 373; figure 2.

*Primary Examiner*—Curtis A. Kuntz
*Assistant Examiner*—Binh K. Tieu
*Attorney, Agent, or Firm*—IP Group of Pillsbury Madison & Sutro LLP

[57] ABSTRACT

The invention relates to a wireless local loop system comprising base stations and an access network node which connects the cordless terminal equipments (T) to the exchange of the fixed network. The air interface between the cordless terminal equipment and the base station is mainly in accordance with the GSM mobile system. In addition to the base station, the terminal equipment (T) also measures the field strength and quality of the radio channel. There are at least two measurement periods during a multiframe of a traffic channel (TCH), and the terminal equipment transmits the measurement results of the first measurement period on a single burst in a time slot of a slow associated control channel (SACCH) and the measurement results of the second measurement period in a single burst in a time slot of an IDLE FRAME. There are at least two transmissions of control information during the multiframe, and the base station transmits the first control information in a single burst in a time slot of the SACCH and the second control information in a single burst in a time slot of the IDLE frame. In this manner the measurement period can be made shorter than the frequency of the Rayleigh fading.

4 Claims, 2 Drawing Sheets

| | |
|---|---|
| IDLE | 25 |
| TCH/F | 24 |
| TCH/F | 23 |
| TCH/F | 22 |
| TCH/F | 21 |
| TCH/F | 20 |
| TCH/F | 19 |
| TCH/F | 18 |
| TCH/F | 17 |
| TCH/F | 16 |
| TCH/F | 15 |
| TCH/F | 14 |
| TCH/F | 13 |
| SACCH/TF | 12 |
| TCH/F | 11 |
| TCH/F | 10 |
| TCH/F | 9 |
| TCH/F | 8 |
| TCH/F | 7 |
| TCH/F | 6 |
| TCH/F | 5 |
| TCH/F | 4 |
| TCH/F | 3 |
| TCH/F | 2 |
| TCH/F | 1 |
| TCH/F | 0 |

TCH/F + SACCH/TF MULTIFRAME

Fig. 2

RADIO SYSTEM FOR CORDLESS SUBSCRIBER LINE INTERFACE

This application is the national phase of international application PCT/FI96/00008, filed Jan. 4, 1995 which was designated the U.S.

BACKGROUND OF THE INVENTION

The invention relates to a wireless local loop system comprising base stations and an access network node which connects the cordless terminal equipments to the exchange of the fixed network. The system especially comprises an air interface between the cordless terminal equipment and the base station, the interface being mainly in accordance with the GSM mobile system, wherein a multiframe of a traffic channel TCH consists of 26 TDMA frames, at least one of which is a frame of a slow associated control channel (SACCH) in the time slot of which the terminal equipment (T) transmits measurement information to the base station and the base station (BS) transmits control information to the terminal equipment, and one frame is an IDLE frame.

When a telephone network is being built, the installation of the subscriber lines between the exchange and the subscriber equipments is not only considerably expensive but also requires a great deal of time. Usually the network of subscriber lines is formed in such a way that twin cables beginning in several subscriber equipments are supplied to a distribution frame, and cables originating in several crossbar switches are combined in another distribution frame the cable of which is supplied to the exchange. The signalling interface between the exchange and the subscriber lines is standardized, and it is either an interface of two-wire analogous subscriber lines, a multiplexer interface according to Recommendation V2 of the CCITT, or a message-based multiplexer interface according to Recommendation V5.1 of the ETSI. Altering fixed subscriber lines is troublesome, and maintenance costs especially in areas where the subscriber lines are overhead lines can be considerable. A solution to these problems is replacing the fixed lines between the exchange and the subscriber equipments with radio lines. The solution is known as a wireless local loop (WLL) system.

The principle of the WLL system is shown in FIG. 1. A wireless stationary terminal equipment T comprises a radio unit 4 provided with an antenna, and a telephone adapter that connects a standard subscriber equipment 5 to the terminal equipment. The subscriber equipment may be a normal telephone set, a telefax terminal, or a modem. It is attached to the terminal equipment by inserting a standard plug in the adapter connection of the terminal equipment. The user utilizes the subscriber equipment 5 in the same way as in a conventional fixed network, even though the subscriber line connection consists of a radio line between the terminal equipment T and the base station BS 2 or 3. The base station may serve several subscriber equipments. The base station is connected to a special access network node 1, which in turn is connected to a standard exchange. Several base stations may be connected to one access network node 1.

The WLL system may be built by using components of an existing mobile phone system. The mobile system may be for example an analogous NMT system or a digital GSM system. In such a case, the signalling of the WLL system is in accordance with the system concerned, the base stations are standard base stations of this system, and the radio unit of the terminal equipment is similar to the radio unit of the mobile station or the terminal equipment may be a mobile station in a mobile system. An important component in the WLL system is the access network node that connects the subscribers to the standard local exchange. The access network node converts the WLL network signalling, for example NMT or GSM signalling, into signalling suitable for the fixed network (e.g. PSTN), and correspondingly it adapts the signalling of the fixed network to the WLL network interface.

The network node is connected to the local exchange with an open V2- or V5.1-type multiplexer interface that utilizes a 2 Mbit/s PCM system. If the local exchange only supports the two-wire interface, the network node is connected to the exchange by converting the V2 signalling into an analogous two-wire subscriber loop interface by means of a multiplexer. The signalling between the network node and the base stations connected thereto is the signalling of an adapted mobile network, but it is modified in such a way that the functions, such as cell handover and roaming, typical of the cellular network are prevented. Therefore, the subscriber must remain within the coverage area of the base station assigned to it. The routing of an incoming call and an outgoing call is based on the subscriber database of the network node. The operation of the network node corresponds to the operation of a concentrator: a call is forwarded from a subscriber interface to the exchange, and the analysis of the numbers, calculation and other functions are performed in the exchange.

According to what is described above, a WLL network may be based on a known GSM system. The GSM is a digital cellular system based on time division multiple access. The channels of the system will be described below.

Logic channels are divided into traffic channels TCH that transmit speech and data, and into control channels that forward signalling and synchronization data. Traffic channels include a full rate traffic channel TCH/F and a half rate traffic channel TCH/H. The full rate traffic channel is always allocated together with a slow associated control channel SACCH. Therefore one carrier wave can be used to form eight TACH/F channels when all the time slots of the TDMA frame are allocated to traffic channels.

The TCH/F+SACCH/TF multiframe shown in FIG. 2 comprises 26 successive frames, in which the TCH/F cycle of 26 time slots comprises 24 time slots in which the TCH/F burst is transmitted, one time slot in which the SACCH burst is transmitted, and one time slot, IDLE, in which no transmission occurs. According to the figure, the SACCH burst is transmitted in the time slot of frame 12, and no transmission occurs in the time slot of frame 25 IDLE.

A mobile station utilizes the SACCH for forwarding different measurement results to the base station. The base station transmits commands related to power control and timing advance to the mobile station on the control channel. Further, the base station transmits general network information, so-called system_infos 5 and 6. This information contains a list of frequencies of neighbouring cells to be monitored, the base station identity code BSIC, the BCCH frequency data, parameters relating to interference control of the radio line, etc. The information is also transmitted on the broadcast control channel (BCCH). The SACCH message contains a so-called Layer 1 Header wherein the timing advance and power control commands are transmitted in the downlink direction, and acknowledgment of the aforementioned commands is forwarded in the uplink direction.

The mobile station and the base station must measure the power of the signal they have received, and the mobile station must also measure the power of the BCCH carrier of the neighbouring base stations. The quality of the received signal is also measured by calculating the bit error ratio. The mobile station must report the results of the measurement to its own base station. It reports them on the aforementioned SACCH. According to the GSM recommendation, the measurement results must be reported at least once a second. This means that the cycle of measurement and reporting contains four multiframes, 480 ms in time, during which the measurements are performed, and another four multiframes, 480 ms in time, during which the measurement results are transmitted. If the SACCH is only utilized for reporting, the mobile station can report the measurement results twice a second. The measurement and reporting cycle contains four multiframes, wherefore the results are transmitted every 480 ms. The mobile station manages to perform the decoding of the BCCH signal of the neighbouring cells only during the time slot of the last, i.e. idle, frame in the multiframe (FIG. 2).

The base station uses the measurement results for controlling both the power of its own transmitter and the power of the mobile station, for providing the mobile station with the timing advance, and for handover purposes. The purpose of power control both in the uplink and downlink direction is, firstly, to improve the efficiency of the frequency spectrum by decreasing the power of the transmitters as much as possible during the connection while maintaining a good connection quality, and secondly, to increase the battery life of the mobile station.

In a mobile system, obstacles over the radio path result in the arrival of several reflected signals at the receiver, causing thus changes in the amplitude. This phenomenon is known as Rayleigh fading, since the amplitude of the sum of several signals with a random distribution of phases is Rayleigh-distributed. Due to the Rayleigh fading, an additional margin is required at the level of the transmission since the power control of the transmitter cannot follow rapid changes in the signal level.

The additional power that is required for compensating for the Rayleigh fading and that is added to the transmissions of both the mobile station and the base station is problematic, since the interference increases disturbance in the reception of the other users, thus decreasing the network capacity. The additional transmit power also decreases the battery life of the mobile station. The aforementioned problems concern both the GSM system and the WLL system based thereon.

SUMMARY OF THE INVENTION

The purpose of the present invention is to provide a wireless local loop system by means of which the Rayleigh fading does not have to be compensated for with additional transmit power and in which the power control is so fast that it manages to follow the changes of signal amplitude caused by the Rayleigh fading.

This objective is achieved with the wireless local loop system according to the characterizing part of claim 1.

According to the invention, power control is accelerated by utilizing both SACCH frames and IDLE frames for transmitting measurement results and power control commands. The measurement report and the power control command are transmitted in a single burst.

BRIEF DESCRIPTION OF THE DRAWING

In the following, the invention will be described in greater detail with reference to the accompanying drawings, in which
FIG. 2 shows a multiframe of a traffic channel.

DETAILED DESCRIPTION OF THE PREFERRED EMBODIMENT

Figure 1:
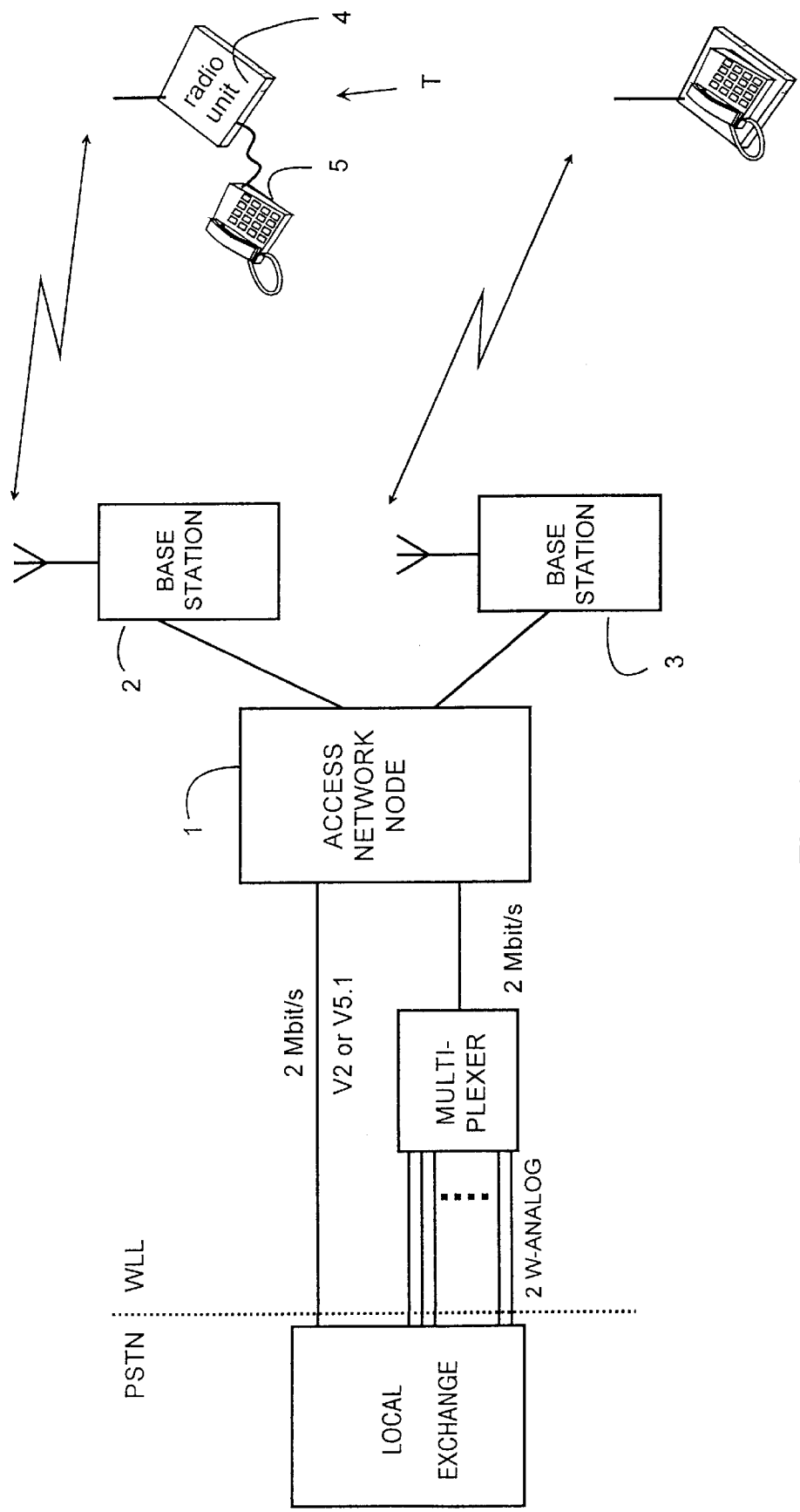
FIG. 1 shows the principle of the WLL system.

In WLL applications, a subscriber may move within his home cell, but intercell handover is prevented. This decreases considerably the need of the mobile station for measurement. It is useless for the mobile station to measure the strength of the BCCH carrier of the neighbouring stations, and therefore the calculation required for the measurements is not required either. The base station concerned therefore does not have to transmit information, so-called system_infos 5 and 6, concerning the neighbouring base stations to the mobile station, since this information is already transmitted on the BCHH.

Another typical feature of the WLL application is that the subscriber equipment is mostly stationary or moves only slowly. Therefore the Rayleigh fading is very slow.

Since the measurements relating to intercell handover and the measurement reporting are not required, the power control cycle can be accelerated so much that it is more rapid than the frequency of the Rayleigh fading. The remaining measurements to be performed are normal measurements according to the GSM recommendation, concerning the connection between a subscriber equipment and a base station. When the measurement results are forwarded to the base station and the base station gives the power control commands in the manner according to the invention described below, the power control cycle can be decreased to nearly a tenth of the cycle of the GSM system.

Due to the decreased measurement need, the length of the measurement report transmitted to the base station by the terminal equipment can be reduced so that the measurement results can be transmitted in a single burst. The channel-coded 456-bit block is transmitted in four bursts, wherefore the burst of the measurement results uses 114 bits.

There are two measurement periods during the multiframe, the measurement report of the first measurement period being transmitted during the SACCH frame of the multiframe, and the second report being transmitted in the IDLE frame. The same measurements are performed during each measurement period. The IDLE frame can be used since the measurements of the neighbouring base stations do not have to be processed during the IDLE frame as in the GSM system. Therefore, two measurement result bursts can be transmitted during the multiframe. The length of the multiframe is 120 ms, wherefore the measurement results can be transmitted in the uplink direction every 60 ms. The rate is significant, considering that in the GSM system the measurement results are transmitted every 500 ms.

The multiframe of the system according to the invention comprises in fact two SACCH frames and no IDLE frame, whereupon the structure is as shown in FIG. 2, except that frame 25 "IDLE" is changed to a SACCH frame.

The base station receives the measurement report, calculates the power control need and possibly the timing advance value on the basis of the report, and gives the power control command (and, if required, the timing advance command) to the terminal equipment. The SACCH frame and the IDLE frame of the multiframe are used for transmitting the command in the downlink direction. Therefore the base station can always provide a command message in response to a measurement report transmitted by a terminal equipment. The command messages are thus transmitted every 60 ms. Since the system_info 5 and 6 messages related to the network are not transmitted at all, there is additional space available in the message. This space can be utilized by protecting the command message with additional coding.

With the system according to the invention, the power control cycle of measurement, report, analysis and power control command can be reduced to such an extent that the effect of the Rayleigh fading can be effectively compensated for. Therefore the additional transmit power used as a result of the Rayleigh fading can be minimized.

The system suggested above requires some changes in the standard GSM system. The SACCH must be respecified due to the use of the IDLE frame. The control message transmitted by the base station on the SACCH must also be edited. The functions must be changed in such a way that the access network node does not perform the handover algorithm and that no kind of measurement on the neighbouring cells or reporting of the measurement results are performed. The base station does not transmit the system_info 5 and 6 messages on the SACCH.

It must be understood that the above description and the figures related thereto are only intended to illustrate the present invention. Different variations and modifications of the invention will be evident for those skilled in the art without deviating from the scope and spirit of the invention disclosed in the appended claims.

What is claimed is:

1. A wireless local loop system comprising base stations and an access network node which connects cordless terminal equipment to an exchange of a fixed network, an air interface between the cordless terminal equipment and the base stations being mainly in accordance with a TDMA mobile radio system in which a multiframe of a traffic channel TCH consists of several TDMA frames, at least one frame of which is a frame of a slow associated control channel (SACCH), in a time slot of which frame the cordless terminal equipment transmits measurement information to a base station of the base stations and the base station transmits control information to the cordless terminal equipment, and one frame is an IDLE frame, wherein there are at least two measurement periods during the multiframe, and the cordless terminal equipment transmits measurement results of the first measurement period in a single burst in a time slot of the SACCH and measurement results of the second measurement period in a single burst in a time slot of the IDLE frame, there are at least two transmissions of control information during the multiframe, and the base station transmits first control information in a single burst in a time slot of the SACCH and second control information in a single burst in a time slot of the IDLE frame, such that when the IDLE frame is used for transmitting measurement results and control information, said frame becomes a SACCH frame.

2. A system according to claim 1, wherein both the first and the second control information consist of a power control command in response to which the terminal equipment adjusts its transmit power to correspond to the power defined in the command.

3. A system according to claim 2, wherein the power control command is protected with additional coding.

4. A system according to claim 1, wherein the control information contains the timing advance value.

* * * * *